(12) United States Patent
Brausse et al.

(10) Patent No.: US 10,259,305 B2
(45) Date of Patent: Apr. 16, 2019

(54) ENERGY SUPPLY SYSTEM FOR A MOTOR VEHICLE

(71) Applicant: Dr. Ing. h.c. F. Porsche Aktiengesellschaft, Stuttgart (DE)

(72) Inventors: Stephan Brausse, Erlingen (DE); Philipp Heinz, Weil der Stadt (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 15/865,725

(22) Filed: Jan. 9, 2018

(65) Prior Publication Data

US 2018/0201109 A1    Jul. 19, 2018

(30) Foreign Application Priority Data

Jan. 16, 2017 (DE) .......... 10 2017 100 685

(51) Int. Cl.
| | | |
|---|---|---|
| *B60K 1/04* | (2006.01) | |
| *B62D 21/15* | (2006.01) | |
| *B62D 27/02* | (2006.01) | |
| *H01M 2/10* | (2006.01) | |

(52) U.S. Cl.
CPC .............. *B60K 1/04* (2013.01); *B62D 21/157* (2013.01); *B62D 27/023* (2013.01); *H01M 2/1083* (2013.01); *B60K 2001/0438* (2013.01); *B60Y 2306/01* (2013.01); *H01M 2220/20* (2013.01)

(58) Field of Classification Search
CPC .............. B60K 1/04; B60K 2001/0438; B62D 21/157; B62D 27/023; H01M 2/1016; H01M 2/1072; H01M 2/1077; H01M 2/1083; H01M 2220/20; B60Y 2306/01
USPC .......................................... 180/68.5
See application file for complete search history.

(56) References Cited

U.S. PATENT DOCUMENTS

| | | | |
|---|---|---|---|
| 8,037,960 B2 * | 10/2011 | Kiya ................. | B60K 1/04 180/68.5 |
| 8,074,757 B2 | 12/2011 | Wagner et al. | |
| 8,728,648 B2 * | 5/2014 | Choo ................. | B60L 11/1877 180/68.5 |
| 8,839,895 B2 * | 9/2014 | Kato ................. | B60K 1/04 180/68.5 |

(Continued)

FOREIGN PATENT DOCUMENTS

| | | |
|---|---|---|
| DE | 102007023392 A | 11/2008 |
| DE | 102010050826 A1 | 5/2012 |

(Continued)

OTHER PUBLICATIONS

German Search Report for German Application No. 10 2017 100 685.0, dated Oct. 20, 2017 with partial English translation, 8 Pages.

(Continued)

*Primary Examiner* — John D Walters
(74) *Attorney, Agent, or Firm* — RatnerPrestia

(57) ABSTRACT

An energy supply system for a motor vehicle, includes a first energy supply and a first housing surrounding the first energy supply. The first housing is fastenable to a first longitudinal member and to a second longitudinal member of a body of the motor vehicle. The first housing is designed for transmitting force from the first longitudinal member to the second longitudinal member and vice versa.

13 Claims, 2 Drawing Sheets

(56) References Cited

U.S. PATENT DOCUMENTS

| | | | | |
|---|---|---|---|---|
| 9,061,712 | B2* | 6/2015 | Patberg | B62D 21/157 |
| 9,283,838 | B2* | 3/2016 | Ohashi | B60K 1/04 |
| 9,873,456 | B2* | 1/2018 | Hara | B60K 1/04 |
| 10,099,546 | B2 | 10/2018 | Mara et al. | |
| 2014/0117716 | A1 | 5/2014 | Patberg et al. | |
| 2017/0355255 | A1 | 12/2017 | Brausse et al. | |

FOREIGN PATENT DOCUMENTS

| | | |
|---|---|---|
| DE | 102011051698 A1 | 1/2013 |
| DE | 102012000622 A1 | 7/2013 |
| DE | 102013011754 A1 | 9/2014 |
| DE | 102014224545 A1 | 6/2016 |
| DE | 102016110787 A1 | 12/2017 |
| JP | 2012106558 A | 6/2012 |
| JP | 2014522774 A | 9/2014 |
| JP | 2015150927 A | 8/2015 |
| JP | 2017193287 A | 10/2017 |
| KR | 20130026202 A | 3/2013 |
| KR | 101488425 B1 | 2/2015 |

OTHER PUBLICATIONS

Japanese Notification of Reason for Rejection for Japanese Application No. 2017-247457, dated Oct. 19, 2018—5 pages.
Korean Office Action for Korean Application No. 10 2018 0004227, dated Dec. 14, 2018—3 pages.

* cited by examiner

ENERGY SUPPLY SYSTEM FOR A MOTOR VEHICLE

CROSS-REFERENCE TO RELATED APPLICATIONS

This application claims priority to German Patent Application No. DE 10 2017 100 685.0, filed Jan. 16, 2017, the content of such application being incorporated by reference herein in its entirety.

FIELD OF THE INVENTION

The invention relates to an energy supply system for a motor vehicle.

BACKGROUND OF THE INVENTION

Various energy supply systems for motor vehicles are known from the prior art. They can comprise a traction battery or an accumulator as energy supply means. The energy supply means is designed to store electrical energy and to output the latter to a drive means. The energy can be stored, for example, chemically. The energy can be used to drive the motor vehicle. The motor vehicle can therefore be driven exclusively or additionally electrically.

DE 10 2010 050 826 A1, which is incorporated by reference herein, discloses a traction battery which is arranged between two longitudinal members of a vehicle body. It is connected to the longitudinal members via deformation elements. However, the construction space in this region is limited since the longitudinal members are connected to each other by transverse struts in order, in the event of a side impact of the motor vehicle, to absorb forces and to protect the traction battery. The transverse struts therefore require construction space which cannot be used for the traction battery.

SUMMARY OF THE INVENTION

The invention relates to an energy supply system which uses the construction space more efficiently for storing energy. In addition, the intention is to provide a motor vehicle with such an energy supply system.

The energy supply system comprises a first energy supply means and a first housing surrounding the first energy supply means. The energy supply means may be a battery, a traction battery or an accumulator, for example. The first housing can be, for example, of box-shaped design and can completely surround the first energy supply means. It is also possible that the first housing surrounds a large part of the first energy supply means.

The first housing is fastenable to a first and to a second longitudinal member of a body of the motor vehicle. A longitudinal member is understood here in particular as meaning a supporting component of the body. For example, a longitudinal member can be arranged in a lateral end region of the motor vehicle. It is also possible that a longitudinal member is arranged in the central region of the motor vehicle.

The first housing is designed for transmitting force from the first longitudinal member to the second longitudinal member and vice versa. This can mean, for example, that the first housing is of particularly stiff design in order to protect the energy supply means against dynamic action. In addition, the connections between the longitudinal members and the first housing can be designed for transmitting forces. In contrast to the prior art, for example, the connections can break only in the event of relatively large forces while, in the prior art, this already takes place in the event of relatively small forces in order to convert impact energy into energy of deformation of the deformation elements.

According to an embodiment of the invention, the energy supply system can comprise a connecting means with which the first housing is fastenable to the first longitudinal member. The connecting means can be in particular of deformation-resistant design and/or designed for transmitting force from the longitudinal member to the first housing and vice versa. For example, the connecting means can have a u-shaped cross section and can be designed as an extruded profile. The first longitudinal member can be arranged in particular in a central region of the motor vehicle.

According to an exemplary embodiment of the invention, the energy supply system can comprise a deformation element. A deformation element is understood here as meaning in particular an element which is deformed when a threshold is exceeded by a force acting on the deformation element. The threshold can be selected here such that the deformation element is deformed before deformation of the first housing occurs. The risk of damage to the first housing can thus be reduced. Such a deformation element is described, for example, in subsequently published DE 10 2016 110 787 A1, which is incorporated by reference herein. The first housing can be fastenable to the second longitudinal member by means of the deformation element. The second longitudinal member can be arranged, for example, in a lateral region of the motor vehicle. This can be, for example, a lateral frame part of the body.

According to an exemplary embodiment of the invention, the first housing can be designed as a single part or a single piece. This has the advantage that the first housing particularly readily transmits forces.

According to an exemplary embodiment of the invention, the energy supply system can comprise a base plate. The first housing can be connectable to the base plate. In the installed state, the base plate can be arranged below the first housing. The base plate can protect the first housing against damage, moisture and dirt.

According to an exemplary embodiment of the invention, the energy supply means can comprise a first and a second fastening means. The first housing can be fastenable with the first and the second fastening means to the base plate. The first fastening means can be fixedly connected to the base plate. For example, the first fastening means can be welded to the base plate. The first fastening means can be, for example, a nut with an internal thread. In this case, the second fastening means can be a screw with an external thread, and therefore the second fastening means is screwable into the first fastening means. Each fastening means may be an internal thread, an external thread, a connector, a plug, a magnet, a fastener, a screw, a bolt, and so forth.

According to an exemplary embodiment of the invention, the first housing can have a recess through which the second fastening means projects in the state connected to the base plate. Within the scope of this description, a recess is understood as meaning in particular an indentation. The indentation can be, for example, a region of the housing having a smaller wall thickness in comparison to regions adjacent thereto. However, it is also possible for it to be a recess in the conventional sense.

According to an exemplary embodiment of the invention, the energy supply system can comprise a second energy supply means and a second housing surrounding the second energy supply means. The second housing can be designed here in the same manner as or a similar manner to the first housing. The second housing can be fastenable with the connecting means to the first longitudinal member. The connecting means can therefore be designed in a manner saving on construction space for fastening the first and the second housing to the first longitudinal member.

BRIEF DESCRIPTION OF THE INVENTION

Further features and advantages of the present invention become clear using the description below of preferred exemplary embodiments with reference to the attached figures. The same reference numbers are used here for identical or similar components and for components with identical or similar functions.

DETAILED DESCRIPTION OF THE INVENTION

Figure 1:
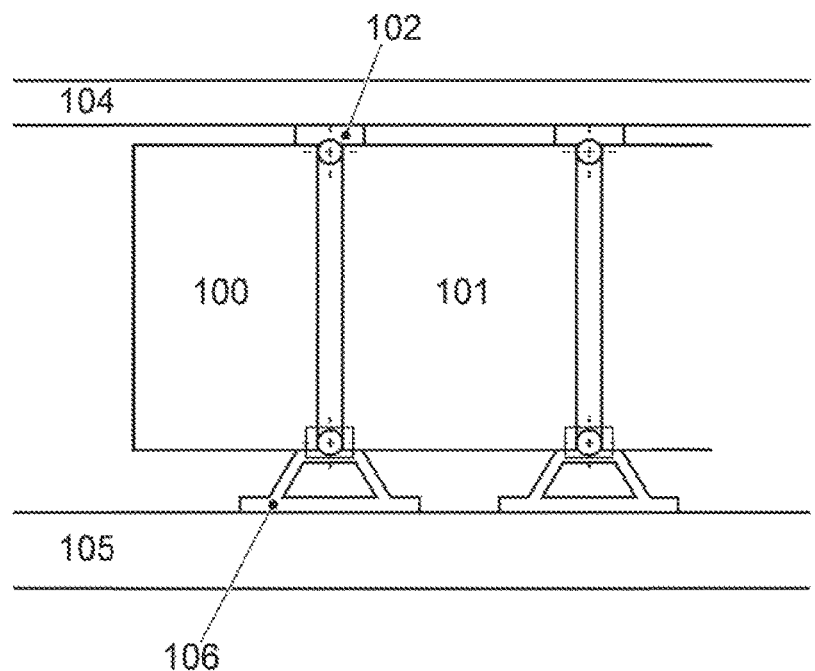
FIG. 1 shows a schematic view of an energy supply system, which is fastened to two longitudinal members of a motor vehicle, according to an embodiment of the invention.
Figure 2:
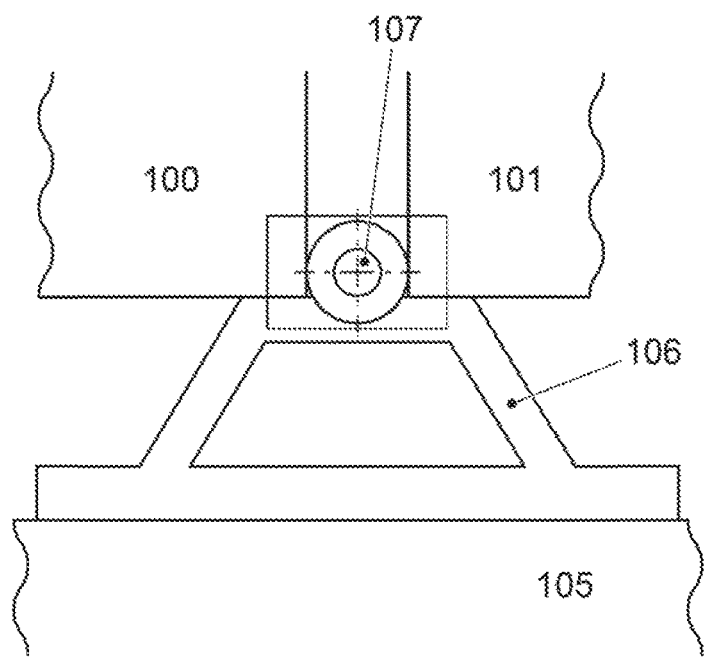
FIG. 2 shows an enlarged detail from FIG. 1.

The energy supply system comprises a first energy supply means which is surrounded by a first housing 100, and a second energy supply means which is surrounded by a second housing 101. The two housings 100 and 101 are fastened with a connecting means 102 to a first longitudinal member 104 of a vehicle body. In addition, the two housings 100 and 101 are fastened with a deformation element 106 to a second longitudinal member 105.

The two housings 100 and 101, the connecting means 102 and the deformation element 106 are designed for transmitting force between the two longitudinal members 104 and 105. For example, the deformation element 106 can be designed in such a manner that it is deformed only by a comparatively large force. This force can be, for example, slightly smaller than the force at which the housings 100 and 101 would be deformed.

A reliable transmission of force between the two longitudinal members 104 and 105 is thereby achieved by the housings 100 and 101. Nevertheless, in the event of large forces occurring, the risk of damage to the energy supply means is reduced.

The connecting means 102 can be designed, for example, as an extruded profile with u-shaped cross section. The housings 100 and 101 can be screwed together with the connecting means 102. In addition, the housings 100 and 101 are fastened to the deformation element 106 via a screw 107. The housings 100 and 101 can alternatively also be fastened to the deformation element 106 via two screws.

Figure 3:
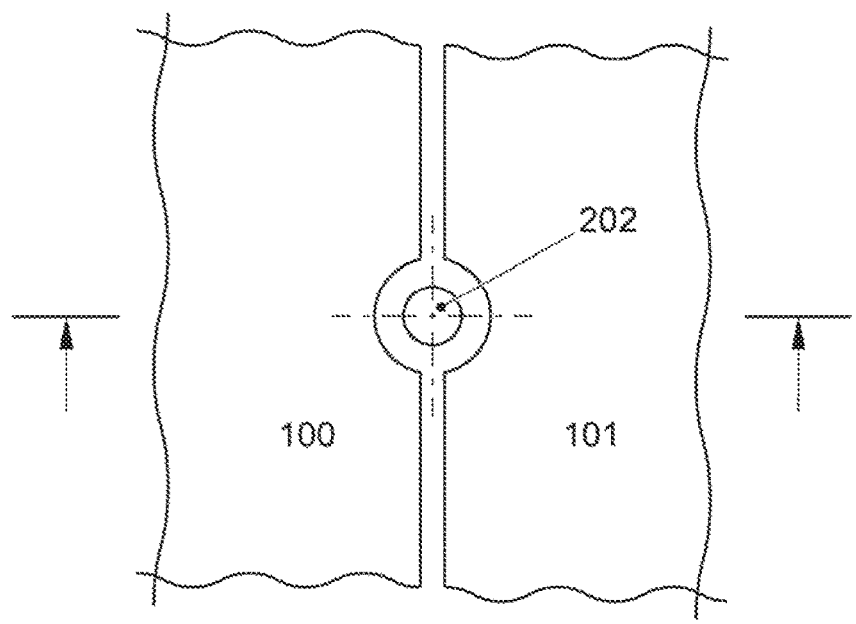
FIG. 3 shows a schematic top view of two housings fastened to a base plate.
Figure 4:
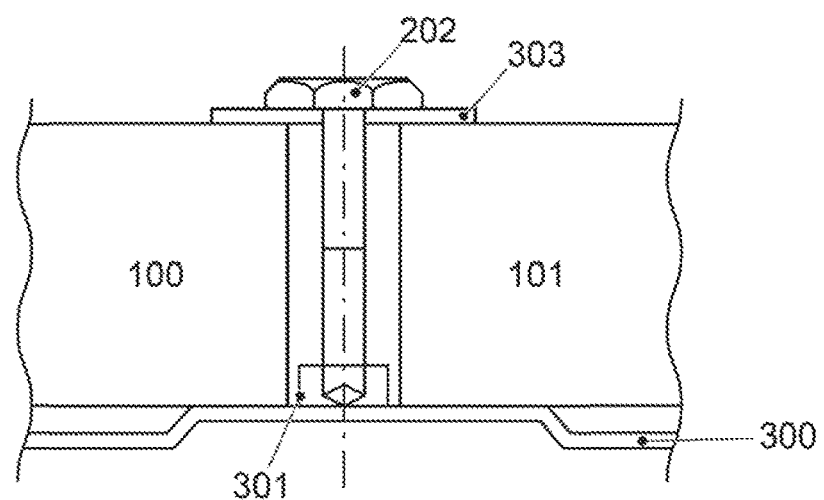
FIG. 4 shows a sectional view of the arrangement from FIG. 3.

It is illustrated in FIG. 3 that the two housings 100 and 101 each have a recess. Projecting through the recesses is a screw 202 with which the two housings 100 and 101 are fastened to a base plate 300 (FIG. 4). For this purpose, a nut 301 is fastened to the base plate 300. The nut 301 can be welded, for example, onto the base plate 300. In order to connect the housings 100 and 101 to the base plate, the screw 202 is then screwed into the nut 301. In the connected state, a washer 303 is also arranged between the screw head and the housings 100 and 101. The base plate 300 protects the housings 100 and 101 against damage, moisture and dirt.

What is claimed is:

1. An energy supply system for a motor vehicle, comprising:
a first energy supply and a first housing surrounding the first energy supply,
a second energy supply and a second housing surrounding the second energy supply, wherein the first housing is fastenable to a first longitudinal member and to a second longitudinal member of a body of the motor vehicle, wherein the first housing is configured for transmitting force from the first longitudinal member to the second longitudinal member and vice versa, and
a deformation element extending between and connecting the first longitudinal member to the second longitudinal member, the deformation element being located between the first housing and the second housing.

2. The energy supply system as claimed in claim 1, wherein the energy supply system comprises a connecting means with which the first housing is fastenable to the first longitudinal member.

3. The energy supply system as claimed in claim 2, wherein the second housing is fastenable with the connecting means to the first longitudinal member.

4. The energy supply system as claimed in claim 1, wherein the second longitudinal member is arranged in a lateral region of the motor vehicle.

5. The energy supply system as claimed in claim 1, wherein the first housing is a single part or single piece.

6. The energy supply system as claimed in claim 1, wherein the energy supply system comprises a base plate and the first housing is connectable to the base plate.

7. The energy supply system as claimed in claim 6, wherein the energy supply system comprises a first fastening means and a second fastening means, wherein the first housing is fastenable to the first fastening means and the second fastening means is fastenable to the base plate, wherein the first fastening means is fixedly connected to the base plate.

8. The energy supply system as claimed in claim 7, wherein the second fastening means is screwable into the first fastening means.

9. A motor vehicle comprising the energy supply system as claimed in claim 1 and a body with the first longitudinal member and the second longitudinal member, wherein the first housing is fastened to the first longitudinal member and to the second longitudinal member.

10. The energy supply system as claimed in claim 1, wherein the first housing is fastened to the first longitudinal member and to the second longitudinal member.

11. The energy supply system as claimed in claim 1, wherein one end of the first housing is fastened to the first longitudinal member and the other end of the first housing is fastened to the second longitudinal member, and one end of the second housing is fastened to the first longitudinal member and the other end of the second housing is fastened to the second longitudinal member.

12. The energy supply system as claimed in claim 1, wherein the housings are arranged in a row and the row extends along a length dimension of the longitudinal members.

13. An energy supply system for a motor vehicle, comprising:
a first energy supply and a first housing surrounding the first energy supply,
wherein the first housing is fastenable to a first longitudinal member and to a second longitudinal member of a body of the motor vehicle, wherein the first housing is configured for transmitting force from the first longitudinal member to the second longitudinal member and vice versa, wherein the energy supply system comprises a base plate and the first housing is connectable to the base plate, wherein the energy supply system comprises a first fastening means and a second fastening means, wherein the first housing is fastenable to the first fastening means and the second fastening means is fastenable to the base plate, wherein the first fastening means is fixedly connected to the base plate, and wherein the first housing has a recess through which the second fastening means projects in a state connected to the base plate.

* * * * *